US005682495A

United States Patent [19]
Beavers et al.

[11] Patent Number: 5,682,495
[45] Date of Patent: Oct. 28, 1997

[54] FULLY ASSOCIATIVE ADDRESS TRANSLATION BUFFER HAVING SEPARATE SEGMENT AND PAGE INVALIDATION

[75] Inventors: Brad B. Beavers; Lew Chua-Eoan; Pei-Chun Peter Liu; Chih-Jui Peng, all of Austin, Tex.

[73] Assignees: International Business Machines Corporation, Armonk, N.Y.; Motorola, Inc., Schaumburg, Ill.

[21] Appl. No.: 353,007

[22] Filed: Dec. 9, 1994

[51] Int. Cl.[6] ............................................. G06F 12/10
[52] U.S. Cl. ........................................................ 395/417
[58] Field of Search ................................. 395/416, 417

[56] References Cited

U.S. PATENT DOCUMENTS

| | | | |
|---|---|---|---|
| 4,602,368 | 7/1986 | Circello et al. | 371/21.1 |
| 4,638,426 | 1/1987 | Chang et al. | 395/421.06 |
| 4,785,398 | 11/1988 | Joyce et al. | 395/403 |
| 4,800,489 | 1/1989 | Moyer et al. | 395/416 |
| 4,811,209 | 3/1989 | Rubinstein | 395/471 |
| 4,910,668 | 3/1990 | Okamoto et al. | 395/417 |
| 5,058,003 | 10/1991 | White | 395/419 |
| 5,099,415 | 3/1992 | Osler et al. | 395/417 |
| 5,222,222 | 6/1993 | Mehring et al. | 395/417 |
| 5,263,140 | 11/1993 | Riordan | 395/417 |
| 5,319,760 | 6/1994 | Mason et al. | 395/418 |
| 5,428,759 | 6/1995 | Smith et al. | 395/403 |
| 5,455,922 | 10/1995 | Eberhard et al. | 395/481 |

*Primary Examiner*—Jack A. Lane
*Assistant Examiner*—Kevin Verbrugge
*Attorney, Agent, or Firm*—Michael A. Davis; Lee E. Chastain; Andrew J. Dillon

[57] ABSTRACT

A fully associative address translator which includes a number of entries, each of said number of entries translating a received effective address into a real address, each received effective address including a segment identifier and a page identifier. Each of the entries within the fully associative address translator includes a first translation from an effective address segment identifier into a virtual address segment identifier and a second translation from a virtual address page identifier to a real address page identifier. A first valid bit cell is provided for storing a validity bit which indicates the validity of the first translation from the effective address segment identifier to the virtual address segment identifier and a second valid bit cell is also provided for storing a validity bit indicating the validity of the second translation from the virtual address page identifier to the real address page identifier wherein a process context switch will invalidate only a portion of each of the entries, thereby reducing the miss penalty associated with a context switch.

6 Claims, 3 Drawing Sheets

FULLY ASSOCIATIVE ADDRESS TRANSLATION BUFFER HAVING SEPARATE SEGMENT AND PAGE INVALIDATION

CROSS REFERENCE TO RELATED APPLICATION

The present invention is related to U.S. patent application Ser. No. 08/223,266, entitled: "Address Translator and Method of Operation," filed Apr. 4, 1994, and assigned to the assignees herein named now U.S. Pat. No. 5,604,879, issued on Feb. 18, 1997. The content of that application is hereby incorporated herein by reference thereto.

BACKGROUND OF THE INVENTION

1. Technical Field

The present invention relates in general to digital computing systems and in particular to address translation methods and devices. Still more particularly, the present invention relates to a fully associative address translation buffer which achieves high speed translation and has reduced miss penalty.

2. Description of the Related Art

Modern data processing systems typically incorporate address translation schemes. Address translation is a process of mapping the memory address manipulated by the system's data processor into an address presented to the system's memory system. Typically, the address manipulated by the data processing system's data processor is referred to as an "effective" or a "logical" address. Conversely, the address presented to the data processing system's communications bus is referred to as a "real" or a "physical" address.

Address translation schemes improve the performance of a data processing system for at least three reasons. First, address translation schemes may be used to define certain useful characteristics about particular sections of main memory. For instance, these characteristics may prevent the system's data processor from writing to input/output devices during certain modes of operation or may restrict other regions of memory from being cached in the data processor's memory cache. Also, multiple software applications can be resident in the data processor's memory at the same time without fear of one program corrupting another program. Second, address translation schemes allow the data processor to execute programs that are larger than the system's random access memory (RAM). The majority of these very large programs are stored in permanent memory devices (such as hard disk drives, magnetic tape drives, etc.). Smaller portions of these very large programs are recalled into this system's RAM as needed. This feature is known as "virtual memory." Thirdly, more than one data processor in a multi-processor data processing system (MP) can easily access the same data stored in memory. Each data processor in an MP system can use a different address to access the same location in memory. This feature simplifies software programming of such a system. This feature may also be used by multiple programs executing in a single data processor data processing system.

There are three basic types of address translation schemes: paging, segmentation, and combined paging/segmentation schemes. These three schemes each have advantages and disadvantages with respect to each other known in the art.

In a paging addressing scheme, the main memory is divided into a number of fixed-sized blocks (pages). A certain number of address bits (typically the most significant bits) of each effective address generated by the data processor identify a selected page within the memory. The remaining number of address bits of each effective address (typically the least significant bits) identify a byte within the selected page. Pages are often relatively small. Therefore, page translation data is voluminous and is stored in a table.

In segmentation addressing schemes the main memory is divided into a number of variable-sized blocks (segments). The most and least significant bits of each effective address generated by the data processor identify a segment and a byte within the selected segment, respectively. Originally, a data processing system's operating system program code, its application program code, its application program data, and its pointer stack were mapped to a different one of four segments in main memory. Consequently, the size of a segment has developed to be several orders of magnitude larger than the size of a page. Segment translation data is smaller and therefore may be stored in either a register file or in a table.

In a combined paging/segmentation scheme, the main memory is also divided into pages. However, each effective address is mapped to an intermediate or "virtual" address by a segmentation scheme before being mapped to a particular page in main memory. Again, the least significant bits of the effective address are utilized to identify a byte within the selected page. In some combination paging/segmentation schemes, both the page and the segments are fixed-sized blocks. The power PC Architecture utilizes such an all fixed-size combination paging/segmentation addressing scheme.

A data processor typically translates each effective address into a real address before it can make any memory access. Consequently, the address translation circuitry is often in the data processor's critical "speed path." Unfortunately, known combination paging/segmentation schemes are becoming only marginal acceptable in light of advances in data processing cycle time. In general, combination paging/segmentation addressing schemes may be described as serial implementations or as parallel implementations. In a serial implementation the most significant bits of an effective address (ESID) are utilized to index into a segment register file/table to select a virtual segment identifier (VSID). The selected VSID is then concatenated with the remaining bits of the effective address to form a virtual address. The most significant bits of the virtual address are utilized to index into a page table to select a real page number (RPN). The selected RPN is then concatenated with the remaining bits of the virtual address to form the real address.

In a parallel implementation the effective address is utilized to simultaneously index into a segment register file/table to select a virtual segment identifier (VSID) and into a page table to select one or more VSID-RPN pairs. The data processor then compares the VSID from the segment table with each VSID from the page table. If one of the comparisons matches, a translation "hit" occurs and the RPN corresponding to the matching VSID is concatenated with the remaining bits of the virtual address to form the real address.

Both of these implementations are relatively slow. The first implementation requires two sequential table look-ups. The second implementation requires a single table look-up followed by a comparison.

It should therefore be apparent that a fully associative address translation buffer which achieves high speed translation, with a reduced miss penalty would be a desirable advance.

SUMMARY OF THE INVENTION

It is therefore one object of the present invention to provide an improved digital computing system.

It is another object of the present invention to provide an improved address translation method and device.

It is still another object of the present invention to provide a fully associative address translation buffer which achieves high speed translation and a reduced miss penalty.

The foregoing objects are achieved as is now described. A fully associative address translator is provided which includes a number of entries, each of said number of entries translating a received effective address into a real address, each received effective address including a segment identifier and a page identifier. Each of the entries within the fully associative address translator includes a first translation from an effective address segment identifier into a virtual address segment identifier and a second translation from a virtual address page identifier to a real address page identifier. A first valid bit cell is provided for storing a validity bit which indicates the validity of the first translation from the effective address segment identifier to the virtual address segment identifier and a second valid bit cell is also provided for storing a validity bit indicating the validity of the second translation from the virtual address page identifier to the real address page identifier wherein a process context switch will invalidate only a portion of each of the entries, thereby reducing the miss penalty associated with a context switch.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
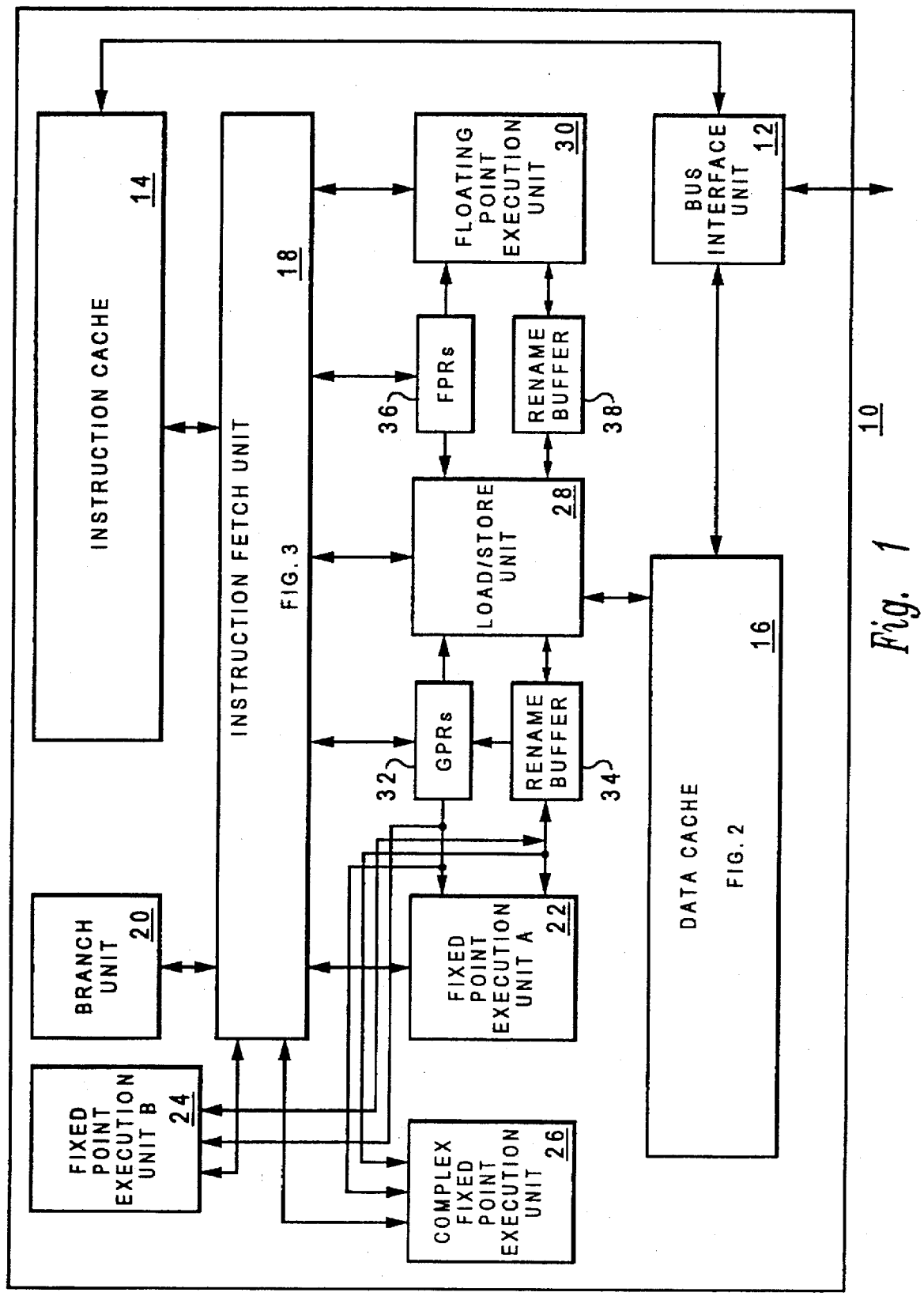
FIG. 1 depicts a block diagram of a data processor constructed in accordance with the present invention.

With reference now to the figures and in particular with reference to FIG. 1, there is depicted a block diagram of data processor 10 which is constructed in accordance with the present invention. Data processor 10 is a data processor that improves its performance by utilizing a combination paging/segmentation address translation scheme. Data processor 10 buffers sixty-four recently utilized address translations in an effective-to-real-address-translator (ERAT). This ERAT is a high speed, fully-associative content addressable memory (CAM) based structure which supports translation mapping invalidation on a segment and page granularity. By eliminating the intermediate virtual address translation step, the ERAT of the present invention is both smaller and faster than a conventional segment table/page table structure. Data processor 10 thus enjoys the speed of a single step address translation scheme and yet maintains the sophistication of a combination paging/segmentation scheme. In addition, the ERAT of the present invention is a fully associative cache structure having separate segment and page invalidation which enjoys high speed translation and a reduced miss penalty.

Still referring to FIG. 1, a bus interface unit (BIU) 12 controls the flow of data between data processor 10 and the remainder of a data processing system which is not depicted. BIU 12 is connected to an instruction cache 14 and to a data cache 16. Data cache 16 is more fully described below in connection with FIG. 2. Instruction cache 14 supplies an instruction stream to an instruction fetch unit 18. Instruction fetch unit 18 forwards individual instructions to an appropriate execution unit. Data processor 10 as depicted within FIG. 1, includes a branch unit 20, a fixed point execution unit A 22, a fixed point execution unit B 24, a complex fixed point execution unit 26, a load/store execution unit 28, and a floating point execution unit 30. Fixed point execution unit A 22, fixed point execution B 24, complex fixed point execution unit 26 and load/store execution unit 28 read and write their results to a general purpose architecture register file 32 (hereinafter referred to as "GPR" and "GPR file" and to a first rename buffer 34.

Floating point execution unit 26 and load/store execution unit read and write their results to a floating point architectural register file 36 (hereinafter referred to as "FPR" and "FPR file") and to a second rename buffer 38.

The operation of data processor 10 without the disclosed invention is well known in the art. In general, branch unit 20 determines what sequence of programmed instructions is appropriate, given the content of certain data register and the instructions themselves. Instruction cache 14 provides the sequence of programmed instructions to instruction fetch unit 18. If instruction cache 14 does not contain the required instructions, then it will fetch those instructions from a main memory system external to data processor 10 (not shown).

Instruction fetch unit 18 issues the individual instructions of the sequence of programmed instructions to the various execution units 20, 22, 24, 26, 28, and 30. Each of the aforementioned execution units performs one or more instructions of a particular class of instructions. The particular class of instructions of each execution unit is generally indicated by the name of the execution unit. For instance, fixed point execution units A and B perform simple mathematical operations on operands in fixed point notation such as addition, subtraction, ANDing, ORing, and EXORing. Complex fixed point execution unit 26 performs more complex mathematical operations on operands expressed in fixed point notations such as multiplication and division. Floating point execution unit 30 preferably performs mathematical operations on operands expressed in floating point notations such as multiplication and division.

Fixed point execution units A and B and complex fixed point execution unit 26 return the results of their operations to designated entries in a first renamed buffer 34. First renamed buffer 34 periodically updates an entry of GPR file 32 with an entry from first rename buffer 34 when all instructions preceding the instruction that generated the result have updated their GPR file entries. Instruction fetch unit 18 coordinates this updating. Both first rename buffer 34 and GPR file 32 can supply operands to fixed point execution units A and B and to complex fixed point execution unit 26.

Floating point execution unit 30 returns the results of its operations to designated entries in a second rename buffer 38. Second rename buffer 38 periodically updates an entry of FPR file 36 with an entry in second rename buffer 38 when all instructions preceding the instruction that generated the result have updated their FPR file entries. Instruction fetch unit 18 also coordinates this updating. Both second rename buffer 38 and FPR file 36 supply operands to floating point execution unit 30.

Load/store unit 28 reads data stored in GPR file 32, first rename buffer 34, FPR file 36 or second rename buffer 38 and writes the selected data to data cache 16. This data may also be written to an external memory system (not depicted) depending upon operating characteristics of data processor 10 not relevant to the disclosed invention. Conversely, load/store unit 28 reads data stored in data cache 16 and writes the read data to GPR file 32, first rename buffer 34, FPR file 36 or second rename buffer 38. If data cache 16 does not contain the required data, then it will fetch it from the main memory system external to data processor 10 via BIU 12.

The operation of data processor 10 with the disclosed data cache is described below in conjunction with FIGS. 2 and 3. In general, data processor 10 is a reduced instruction set computer RISC. Data processor 10 achieves high performance by breaking each instruction into a sequence of smaller steps, each of which may be overlapped in time with steps of other instructions. This performance strategy is known as "pipe lining."

In the depicted embodiment, each instruction is broken into as many as five discrete steps: fetch, dispatch, execute, write-back, and completion. Memory management circuitry (not shown) within instruction cache 14 retrieves one or more instructions beginning at a memory address identified by instruction fetch unit 18 or branch unit 20 during the fetch phase. Instruction fetch unit 18 routes each instruction to the appropriate execution unit after determining that there are no impermissible data dependencies and after reserving a rename buffer entry for the result of the instruction in the dispatch phase.

Each particular execution unit executes its programmed instruction during the execution phase and writes its results, if any to the reserved rename buffer entry during the write/back phase. Finally, instruction fetch unit 18 updates the architectural register files with the result of a particular instruction stored in a rename buffer after every instruction preceding the particular instruction has so updated the architectural register file. Generally, each instruction phase takes one machine clock cycle. However, some instructions require more than one clock cycle to execute while others do not require all five phases. There may also be a delay between the write-back and the completion phases of a particular instruction due to the range of times which the various instructions require to complete.

Figure 2:
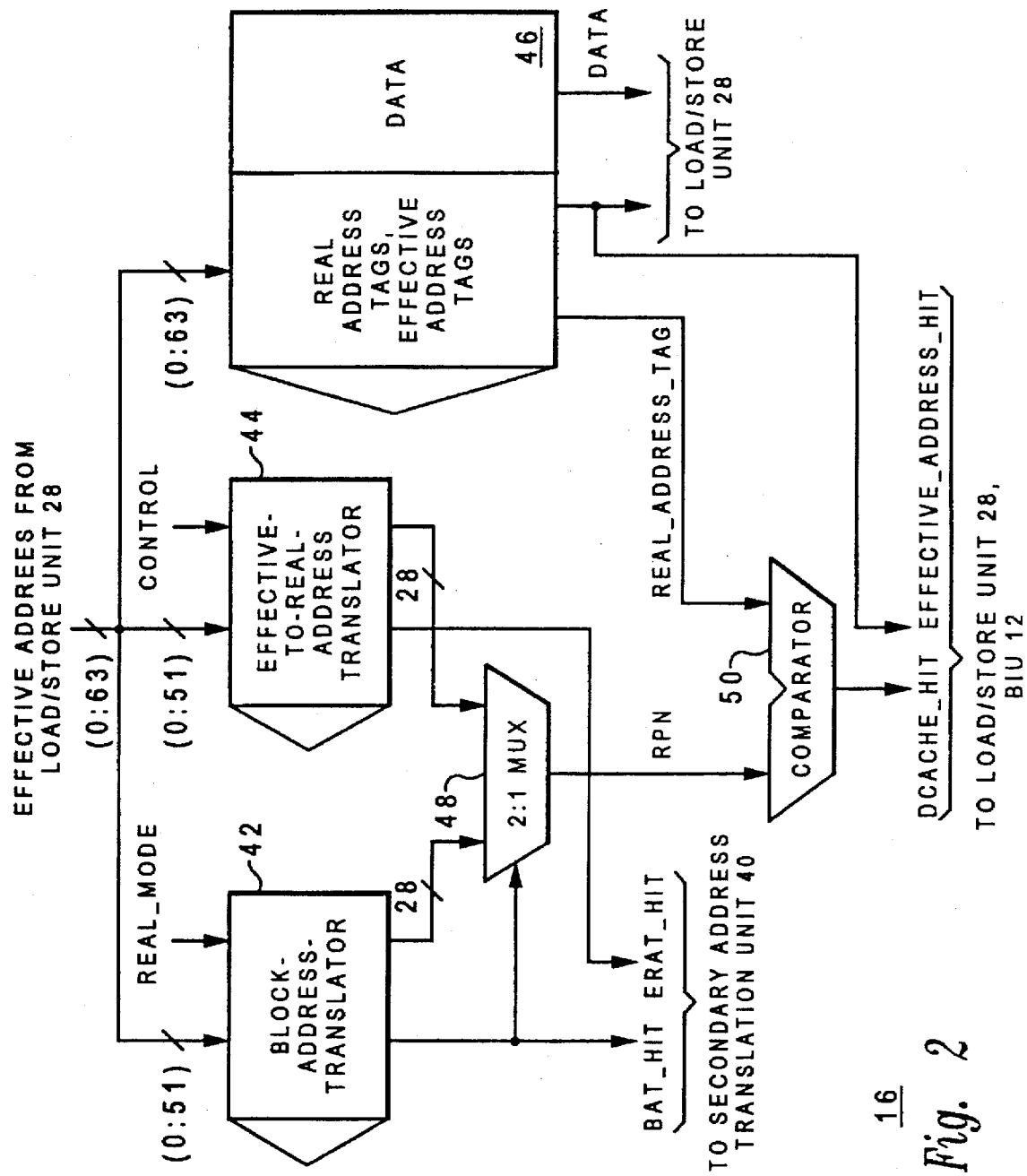
FIG. 2 depicts a block diagram of the data cache of the data processor of FIG. 1.

Referring now to FIG. 2, there is depicted a block diagram of data cache 16 which is illustrated within FIG. 1. It is noted that instruction cache 14 and data cache 16 are substantially similar. The differences between the two structures primarily depend upon the use of the information stored therein. A block address translator (BAT) 42, and effective-to-real-address-translator (ERAT) 44, and a data array 46 receive an effective address of a data access from load-store unit 28 during each clock cycle of data processor 10. A 2:1 multiplexor (MUX) 48 selects the address translation output generated by BAT 42 or by ERAT 44 according to an architected convention.

In parallel with the address translation, data array 46 outputs a cache line and an associated real address tag associated with the presented effective address. A comparator 50 receives the address translation output by multiplexor 48 and the real address tag output by data array 46. If the address translation output and the real address tag are logically equivalent, then the data output to load/store unit 28 is in fact the requested data. Comparator 50 then asserts DCACHE HIT in this case. If the address translation output and the real address tag are not logically equivalent, then the data output to load/store unit 28 is not the requested data. Comparator 50 then de-asserts DCACHE HIT in this case. In the second case, BIU 12 will request the data from the memory system (not shown). BIU 12 will write the data into data array 46 once it receives the data from the memory system.

BAT 42 and ERAT 44 attempt to translate fifty-two most significant bits (MSBs) of each sixty-four bit effective address presented to them by load/store unit 28. If successful, BAT 42 and ERAT 44 generate the twenty-eight MSBs of the real address corresponding to the presented effective address, a real page number (RPN). Each structure will also assert a hit signal indicating a successful translation. BAT 42 asserts the control signal BAT HIT if it successfully translates the effective address. ERAT 44 asserts the control signal ERAT HIT if it successfully translates the effective address. The full forty bit real address of a particular effective address is then generated by concatenating the effective addresses's RPN and the twelve least significant bits (LSBs) of the effective address.

In the power PC architecture the address translated by BAT 42 takes precedence over the address translated by ERAT 44, if any. Therefore, the control signal BAT HIT causes multiplexor 48 to output the RPN generated by BAT 42 when the control signal is asserted. Conversely, the control signal BAT HIT causes multiplexor 48 to output the RPN generated by ERAT 44 when de-asserted. ERAT 44 is more fully described below in connection with FIG. 3.

Data array 46 is a physically indexed semi-associative cache which acts like an eight-way set associative cache. Data array 46 preferably contains five hundred and twelve cache lines that each store four quad-words of data. The five hundred and twelve cache lines are organized into two banks of thirty-two camlets. Each camlet contains eight cache lines. Every four quad-words of data may be mapped to any one of the eight different cache lines in a particular camlet. Each cache line in data array 46 stores a REAL ADDRESS TAG in a content addressable memory (CAM), an EFFECTIVE ADDRESS TAG in a content addressable memory (CAM) and four quad-words of data in a row of static random access memory (SRAMA) bit-cells. Each REAL ADDRESS TAG contains the twenty-eight most significant bits of the real address of the cache line entry. Each EFFECTIVE ADDRESS TAG contains the eight most significant bits of the effective address of the cache line entry.

Data array 46 indexes into one camlet with effective address bits (52:57) for each effective address that load/store unit 28 presents to it. Simultaneously, data array 46 attempts to match effective address bits 44:51 with one of the eight EFFECTIVE ADDRESS TAGS in the one selected camlet. If data array 46 finds an EFFECTIVE ADDRESS TAG match in the selected camlet, then an effective address hit occurs and data array 46 asserts a control signal EFFECTIVE ADDRESS HIT.

In this case, data array 46 outputs the associated five hundred and twelve bits to load/store unit 28. At this point, an effective address hit is the only possible hit. As described above, comparator 50 determines if each effective address hit is an actual data cache hit by comparing the RPN output by multiplexor 48 and the REAL ADDRESS TAG of the selected camlet. If data array 46 does not find an EFFECTIVE ADDRESS TAG match in the selected camlet, then a cache miss occurs and data array 46 deasserts the control signal EFFECTIVE ADDRESS HIT. In this case, BIU 12 requests the data beginning at the forty-bit real address generated by concatenating the RPN and the twelve least significant bits of the presented effective address.

Figure 3:
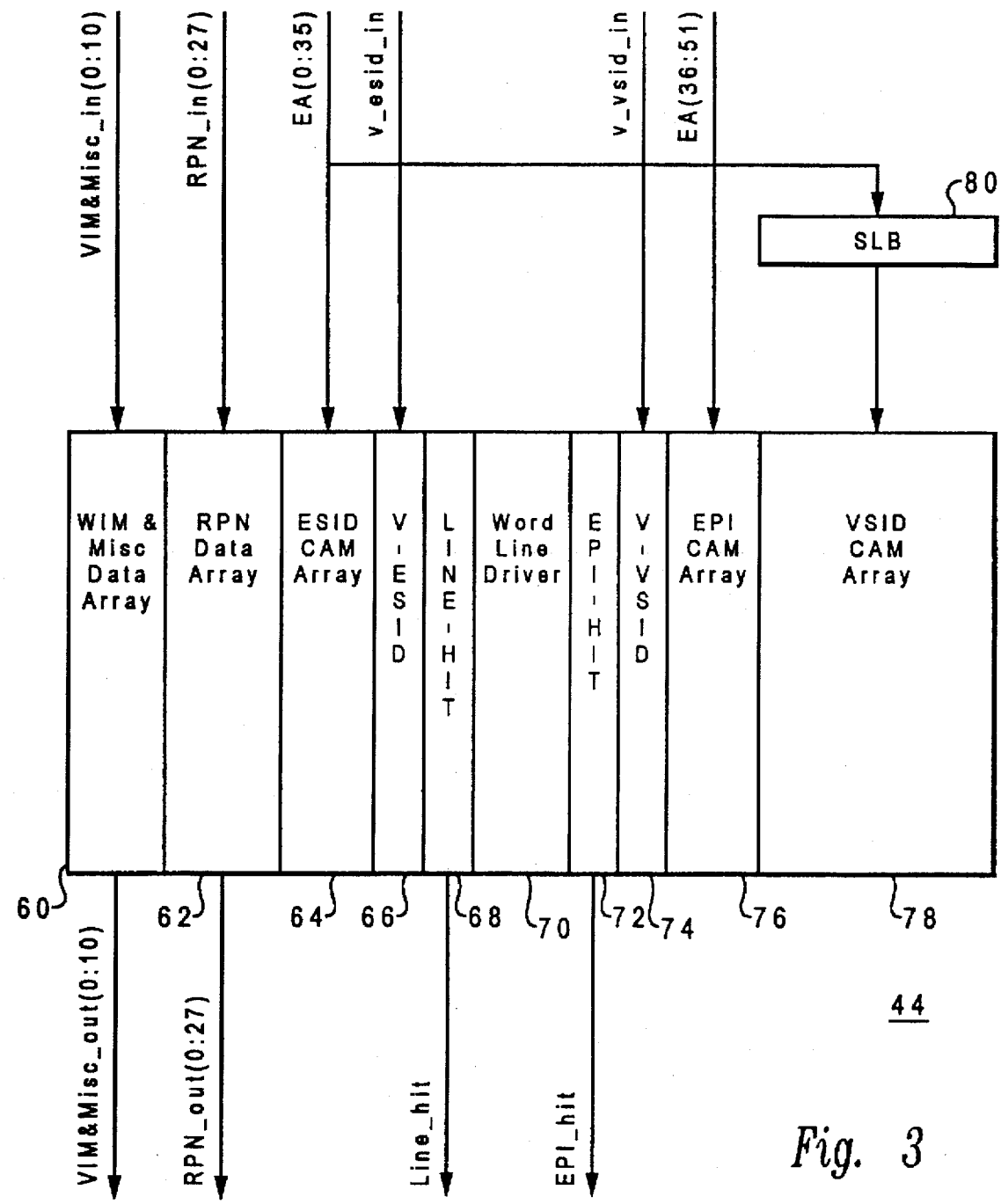
FIG. 3 depicts a block diagram of the effective-to-real-address translator illustrated within FIG. 2.

With reference now to FIG. 3 there is depicted a block diagram of ERAT 44 which is illustrated within FIG. 2. In the depicted embodiment of the present invention, ERAT 44 is utilized to cache sixty-four recently utilized effective to real address translations. Any one of these sixty-four translations may be accessed in a single lookup operation, without requiring an intermediate virtual address translation.

As illustrated, ERAT 44 includes a sixty-four entry content addressable memory (CAM) structure 64, wherein each entry therein contains thirty-six CAM cells connected to a first match line for storing an effective address segment identifier (ESID). A second sixty-four entry CAM structure 76 provides sixty-four entries which each include sixteen CAM cells connected to a second match line storing an effective page identifier (EPI). Finally, a third sixty-four entry CAM structure 78 is provided which includes entries having fifty-two CAM cells for storing a virtual segment identifier (VSID).

As described above, an effective addresses' ESID is the thirty-six most significant bits (MSB) of the effective address. An effective addresses' page identifier (EPI) is the next sixteen most significant bits of the effective address. As those skilled in the art will appreciate, each cell in a CAM structure is typically connected to a match line and each category of CAM cell can independently discharge its respective match line. Thus, each entry in ERAT 44 can map one effective page number to a real page number (RPN) stored with RPN data array 62. The thirty-six most significant bits of the mapped effective address are stored within the entries of ESID CAM 64 and the next sixteen most significant bits are stored in EPI CAM 76. A real address is then generated from the RPN by concatenating the RPN with the twelve least significant bits of the effective address. Each entry in ERAT 44 also includes various status bits regarding the attributes of the resulting page, stored within WIM and Misc Data Array 60.

ERAT 44 performs five functions: translation, refill after miss, segment look-aside buffer invalidate entry (SLBIE), table look-aside buffer invalidate entry (TLBIE), and segment look-aside buffer invalidate all (SLBIA). BIU 12, data cache 16 and instruction fetch unit 18 generate the various control signals utilized to determine which function ERAT 44 will perform.

ERAT 44 performs a translation operation when data cache 16 performs a load or store operation. In a translation operation, ERAT 44 attempts to output an RPN corresponding to the effective address of the instruction's memory location. ERAT 44 first determines if it contains the necessary mapping by applying the thirty-six most significant bits of the effective address to ESID CAM array 64, and to segment look-aside buffer 80, for translation into a virtual segment identifier which may be utilized to search VSID CAM array 78. Additionally, the next sixteen most significant bits are applied to EPI CAM Array 76.

If both the ESID and the EPI of a particular valid entry match the input effective address, then a first and second match line associated with each CAM structure will remain in a precharged state. This particular entry's word line driver will then assert the entry's word line, coupling the bit cells of the corresponding data field within RPN Data Array 62 to the output bit lines. A line hit LINE hit signal is also generated to indicate that the RPN output is valid.

In accordance with an important feature of the present invention, separate validity indicating bits are associated with the various mappings contained with ERAT 44. As illustrated, a V_ESID bit 66 is provided to indicate the validity of the mapping from ESID to VSID. Similarly, a V_VSID bit is provided to indicate the validity of the mapping from VPN to RPN. Thus, in the fully associative address translation buffer of the, present invention a translation hit will only occur when the following conditions have been met: the most significant thirty-six bits of the effective address matches a tag within ESID CAM Array 64 and the corresponding V_ESID bit is a "1"; and, the next sixteen most significant bits matches a tag within EPI CAM Array 76 and the corresponding V_VSID bit is a "1." In response to these conditions both match lines remain in a precharged condition and these two match lines are then logically combined to generate a word line. As described above, this word line activates the output of an RPN from RPN Data Array 62 and the associated status bits within array 60.

As those skilled in the art will appreciate, if either or both the ESID and EPI of a particular entry do not match the input effective address, then either or both the first and second match lines will be discharged. In this case, the particular entry's word line drive will not assert the word line. If none of the entries contains a matching mapping, then no word line driver circuit will assert a word line and a miss will occur. However, in the event there is a match within EPI CAM array 76 an EPI_hit signal will be generated to indicate that there is at least one match in that comparison. Thus, if a translation has failed, the status of the EPI_hit may be utilized to determine whether or not it is necessary to do a second search utilizing a translated VSID generated by SLB 80. In this case, a search into ERAT 44 is activated by comparing the VSID output from SLB 80 with the content of VSID CAM array 78, the next sixteen most significant bits are compared again with the content of EPI CAM Array 76 and the status of the V_VSID bit is determined. If these three conditions are met, the corresponding entry within ESID CAM Array 64 will be refilled with the appropriate ESID and the V_ESID bit will be set to a "1." In the same cycle, the RPN may be read out and compared against the RPN output from the cache line tag output. If this update search fails, then a hardware TLB table walk will be issued. When the TLB table walk completes, an "allocate" cycle will be utilized to determine a least recently utilized (LRU) line within ERAT 44 and the entire line will be refilled.

ERAT 44 performs a segment look-aside buffer invalidate entry (SLBIE) operation whenever instruction fetch unit 18 decodes an SLBIE instruction. In an SLBIE operation, ERAT 44 invalidates all mappings associated with a specified segment or ESID. There may be any number of mappings associated with a particular ESID in ERAT 44 at a given moment. ERAT 44 identifies all mappings corresponding to the specified segment by applying the specified ESID to each entry within ESID CAM array 64, The EPI match line signals will be ignored during this operation and if the input ESID and the content of a particular entry within ESID CAM Array 64 of a particular entry match, then the entry's match line will remain in a precharged state. That particular entry's word line driver will then assert the word line for that entry, coupling the corresponding V_ESID bit to a voltage level corresponding to an invalid entry. This voltage level will then be written to the invalid entry's V_ESID bit.

ERAT 44 also performs a table look-aside buffer invalidate entry (TLBIE) operation whenever instruction fetch unit 18 decodes a TLBIE instruction. In a TLBIE operation, ERAT 44 invalidates all mappings associated with a specified page or EPI. There may be any number of mappings associated with a particular EPI in ERAT 44 at a given moment. ERAT 44 identifies all mappings corresponding to the specified page by applying the specified EPI to each entry within EPI CAM Array 76. In this operation, ERAT 44 will ignore the ESID match line signals. If the input EPI and the contents of an entry within EPI CAM Array 76 of a particular entry match, then the entry's second match line will remain in a precharged state. This particular entry's word line driver will then assert the entry's word line, coupling the corresponding V_VSID bit to a voltage level corresponding to an invalid entry. This voltage level will then be written to the invalid entry's V_VSID bit.

In accordance with an important feature of the present invention the provision of separate valid bits within ERAT 44 for the mapping between ESID to VSID and the mapping from VPN to RPN provides a substantial advantage over prior art systems in the performance of a segment look-aside buffer invalidate all (SLBIA) operation. Such an operation occurs when instruction fetch unit 18 decodes an SLBIA instruction. In an SLBIA operation, ERAT 44 resets the V_ESID bits for all entries within ESID CAM Array 64. By not flushing all of the entries within ERAT 44, a rapid effective address to real address translation may occur directly and the miss penalty which occurs due to process context switch will be reduced. Thus, for example, in the event data within the system is to be transferred from a first process to a second process, the invalidation of the segment look-aside buffer entries without the invalidation of the entries within EPI CAM Array 76 will require substantially less time to refill ERAT 44.

While the invention has been particularly shown and described with reference to a preferred embodiment, it will be understood by those skilled in the art that various changes in form and detail may be made therein without departing from the spirit and scope of the invention.

We claim:

1. An address translator comprising:
   a plurality of entries, each of said plurality of entries translating a received effective address into a real address, each received effective address comprising a segment identifier and a page identifier, each one of said plurality of entries comprising:
   a first translation from an effective address segment identifier to a virtual address segment identifier;
   a second translation from a virtual address page identifier to a real address page identifier;
   a first valid bit cell storing a validity bit indicating the validity of said first translation from said effective address segment identifier to said virtual address segment identifier;
   a second valid bit cell storing a validity bit indicating the validity of said translation from said virtual address page identifier to said real address page identifier; and
   means for resetting only said validity bit within every first valid bit cell in response to a process context switch while maintaining said validity bit within every second valid bit cell indicating the validity of said translation from said virtual address page identifier to said real address page identifier.

2. The address translator according to claim 1, further including:
   a first plurality of content addressable memory bit cells storing a first translation tag, said first plurality of content addressable memory bit cells asserting a first control signal if a received address segment identifier is logically equivalent to said first translation tag.

3. The address translator according to claim 2, further comprising:
   a second plurality of content addressable memory bit cells storing a second translation tag, said second plurality of content addressable memory bit cells asserting a second control signal if a received address page identifier is logically equivalent to said second translation tag.

4. The address translator according to claim 3, further including a segment look-aside buffer for translating a received effective address segment identifier into a virtual address segment identifier.

5. The address translator according to claim 4, further comprising:
   a third plurality of content addressable memory bit cells storing a third translation tag, said third plurality of content addressable memory bit cells asserting a third control signal if said translated virtual address segment identifier is logically equivalent to said third translation tag.

6. The address translator according to claim 5, wherein each entry further includes a plurality of bit cells storing a real address page identifier.

* * * * *

UNITED STATES PATENT AND TRADEMARK OFFICE
CERTIFICATE OF CORRECTION

PATENT NO. :  5,682,495
DATED      :  Oct. 28, 1997
INVENTOR(S) : Beavers et al.

It is certified that error appears in the above-indentified patent and that said Letters Patent is hereby corrected as shown below:

Column 4, line 25:   insert --28-- after "unit".

Column 8, line 3:  insert --_-- after "LINE".

Sheet 1 of 3, delete "FIG.3" in item 18.

Sheet 2 of 3, insert --FIG.3-- in item 44.

Signed and Sealed this

Seventeenth Day of March, 1998

Attest:

BRUCE LEHMAN

Attesting Officer

Commissioner of Patents and Trademarks